US009046003B2

(12) United States Patent
Twell

(10) Patent No.: US 9,046,003 B2
(45) Date of Patent: Jun. 2, 2015

(54) BORE-SCOPE SEALING APPARATUS AND PLUG THEREFOR

(75) Inventor: Philip Twell, Lincoln (GB)

(73) Assignee: SIEMENS AKTIENGESELLSCHAFT, München (DE)

( * ) Notice: Subject to any disclaimer, the term of this patent is extended or adjusted under 35 U.S.C. 154(b) by 248 days.

(21) Appl. No.: 13/810,270

(22) PCT Filed: Jun. 17, 2011

(86) PCT No.: PCT/EP2011/060141

§ 371 (c)(1), (2), (4) Date: Feb. 13, 2013

(87) PCT Pub. No.: WO2012/007248

PCT Pub. Date: Jan. 19, 2012

(65) Prior Publication Data

US 2013/0205675 A1 Aug. 15, 2013

(30) Foreign Application Priority Data

Jul. 15, 2010 (EP) .................................... 10007336

(51) Int. Cl.

*F16B 21/00* (2006.01)
*F01D 25/24* (2006.01)
*F01D 21/00* (2006.01)

(52) U.S. Cl.

CPC .............. *F01D 25/24* (2013.01); *F01D 21/003* (2013.01); *F05D 2260/80* (2013.01)

(58) Field of Classification Search

USPC .......... 411/349, 549, 552, 553, 346; 415/118; 403/348

See application file for complete search history.

(56) References Cited

U.S. PATENT DOCUMENTS

| | | | | |
|---|---|---|---|---|
| 2,852,056 A | | 9/1958 | Rapata | |
| 3,139,134 A | | 6/1964 | Russell | |
| 3,171,182 A | * | 3/1965 | Danehy | 411/552 |
| 4,391,461 A | * | 7/1983 | Deibele | 292/204 |
| 4,395,062 A | * | 7/1983 | F'Geppert | 292/64 |
| 4,470,735 A | | 9/1984 | Salisbury | |
| 4,766,453 A | * | 8/1988 | Shiokama et al. | 396/532 |
| 4,815,276 A | | 3/1989 | Drerup | |
| 4,825,642 A | | 5/1989 | Radtke | |
| 5,079,910 A | * | 1/1992 | Hirst et al. | 60/803 |
| 5,115,636 A | | 5/1992 | Zeiser | |
| 5,152,662 A | | 10/1992 | Hirst | |
| 5,370,488 A | * | 12/1994 | Sykes | 411/551 |
| 5,421,053 A | * | 6/1995 | Chodak | 15/87 |
| 5,867,976 A | * | 2/1999 | Ziegler, Jr. | 60/803 |
| 5,879,116 A | | 3/1999 | Criswell | |
| 5,897,277 A | | 4/1999 | Barre | |

(Continued)

FOREIGN PATENT DOCUMENTS

| | | | |
|---|---|---|---|
| DE | 19609875 | A1 | 9/1996 |
| EP | 1154169 | A1 | 11/2001 |
| GB | 1579730 | A | 11/1980 |

*Primary Examiner* — Gary Estremsky

(57) ABSTRACT

A bore-scope sealing apparatus is provided for removably sealing a bore-scope opening in a turbomachine wall with a plug. The bore-scope sealing apparatus includes a bayonet coupling via which the plug is mountable to the bore-scope opening. The bayonet coupling has a projection at the plug and a corresponding recess at the bore-scope opening. A resilient retaining device is arranged at the recess being compressed by the projection in a sealing position to retain the plug in the bore-scope opening.

14 Claims, 4 Drawing Sheets

(56) References Cited

U.S. PATENT DOCUMENTS 6,155,088 A * 12/2000 Murray et al. .................... 70/58
6,336,766 B1 * 1/2002 De Villele ..................... 403/348
7,743,457 B2 * 6/2010 Metz .......................... 15/250.31
8,186,726 B2 * 5/2012 Zuo ................................ 292/57
2006/0110235 A1 * 5/2006 Dembowsky et al. ........ 411/349

* cited by examiner

BORE-SCOPE SEALING APPARATUS AND PLUG THEREFOR

CROSS REFERENCE TO RELATED APPLICATIONS

This application is the US National Stage of International Application No. PCT/EP2011/060141, filed Jun. 17, 2011 and claims the benefit thereof. The International Application claims the benefits of European application No. 10007336.0 EP filed Jul. 15, 2010. All of the applications are incorporated by reference herein in their entirety.

FIELD OF INVENTION

The present invention relates in general to a bore-scope sealing apparatus and to a plug for a bore-scope sealing apparatus. In particular the invention is directed to a bore-scope sealing apparatus and a plug for turbomachines.

BACKGROUND OF INVENTION

For a compressor like an aircraft turbine or an industrial compressor of a gas turbine engine with relatively high compression ratios of greater than 15 to 1 it may be typical for the rear static vanes to be held in a floating carrier. The carrier may be mounted in an outer pressure casing by means of radial pins to allow for compensation of thermal expansion.

Bore-scope access through aligned holes in the outer casing and the inner carrier is required for inspection of blades and vanes of the compressor. In normal operation these holes are sealed to eliminate air loss and air recirculation. As large access ports in the outer casing or even removal of the outer casing has to be avoided the inner plug has to be removed and securely refitted via a small access port in the outer casing.

U.S. Pat. No. 4,470,735 shows a self locking bolt where the locking device is a expanding snap ring.

U.S. Pat. No. 3,139,134 discloses a locking device comprising a flexible strip at a location of the circumference of the bolt.

U.S. Pat. No. 5,115,636 and U.S. Pat. No. 4,815,276 show spring loaded bore-scope plugs.

U.S. Pat. No. 5,079,910 shows a spring loaded spherical sealing element used in an inspection aperture. The sealing element is pushed aside to give way for the inspection device.

U.S. Pat. No. 5,152,662 discloses a pivoting flap which controls the access to the inspection port.

U.S. Pat. No. 5,879,116 and U.S. Pat. No. 2,852,056 show resilient locking devices used as inserts on screws.

U.S. Pat. No. 4,825,642 discloses a bore-scope plug comprising a seal locked by a screw on its arm.

U.S. Pat. No. 5,897,277 shows a self locking plug with a spring loaded self locking mechanism.

GB 1 579 730 shows a self-locking spring loaded fastener.

The known solutions require large access ports in the outer casing and/or special headed screwed plugs or bayonet plugs on the internal carrier.

SUMMARY OF INVENTION

It is therefore an object of the present invention to improve the sealing of a bore-scope opening.

This object is solved by the features of the independent claim(s). The dependent claims offer further details and advantages of the invention.

In a first aspect the invention is directed to a bore-scope sealing apparatus for removably sealing a bore-scope opening in a turbomachine wall with a plug. The turbomachine wall may be particularly a wall of a compressor. The plug is mountable to the bore-scope opening by means of a bayonet coupling, wherein the bayonet coupling comprises a projection at the plug and a corresponding recess at the bore-scope opening. A resilient retaining means is arranged at the recess and is compressed by the projection in a sealing position to retain the plug in the bore-scope opening. This sealing apparatus has a small footprint and can be removed quickly and easily. Since the bayonet coupling is arranged directly at the bore-scope opening it allows for easy handling. Hence, the apparatus can be utilized especially in or close to restricted areas.

The retaining means may be a spring pin. This is a simple design with good handling allowing for easy rotation of the plug while retaining the plug in a secure manner.

The retaining means may be arranged in an opening accessible from the outside and the opening may be in communication with the recess. This construction is easy to manufacture and maintenance cost and time are low since the retaining means can be removed from the outside.

The projection of the plug may comprise a retaining recess for accommodation of part of the retaining means. The retaining recess allows for improved connection of the bayonet coupling as the plug latches with the retaining means.

The plug may comprise two projections, opposite to each other so that the bore-scope opening is sealed evenly along its circumference. The corresponding recess may be on bigger recess or two distinct recesses with shapes corresponding to the projections. Accordingly, the bore-scope sealing apparatus may comprise two retaining means, opposite to each other to even better retain the plug.

The plug may comprise a head with a drive feature and the head may cover the retaining means at least partially in a sealing position. In this case an expensive fixture of the retaining means can be omitted as they are fixed by the plug itself. Additionally may the retaining means support extraction of the plug by spring force. The same spring force can secure the bayonet coupling by exerting pressure in a longitudinal direction of the plug to the head of the plug thereby minimizing the chance of accidental release of the plug.

The plug may comprise a gasket. A gasket for improved sealing can be utilized at the outer bore-scope and/or the inner bore-scope opening.

The plug may be mountable to an outer bore-scope opening in an outer turbine wall—particularly a wall in a compressor section—and the plug may comprise a shaft with a sealing end for sealing an inner bore-scope opening in an inner turbine wall like an inner carrier. For this configuration the bore-scope apparatus is beneficial as the bayonet coupling is arranged at the outer bore-scope opening which allows for easy construction and handling.

The plug may be mountable to an inner bore-scope opening in an inner turbine wall. The inner turbine wall has usually a lower pressure drop than the outer turbine wall which facilitates easy construction and handling of the plug. With the small plug only a small opening is needed in the outer turbine wall to remove or refit the plug at the inner turbine wall. Also, alignment of inner and outer opening is not so critical when the plug is mounted to the inner turbine wall.

The bore-scope sealing apparatus with the plug mountable to the inner bore-scope opening may have a sealing plate mountable to an outer bore-scope opening in an outer turbine wall. The sealing plate can be made massive more easily as no through hole is needed for the plug.

In a second aspect the invention is directed to a plug for a bore-scope sealing apparatus according to the above description. The plug has a head and a shaft having a longitudinal direction. The shaft comprises a projection at a distance to the head in longitudinal direction. In particular, the shaft may comprise two projections arranged opposite to each other.

In a further development of the shaft each projection has a retaining recess. Furthermore, the shaft may comprise a sealing end for sealing an inner bore-scope opening in an inner turbine wall. The use of the plug in the context of the bore-scope sealing apparatus has been described above with respect to bore-scope sealing apparatus.

BRIEF DESCRIPTION OF THE DRAWINGS

The accompanying drawings are included to provide a further understanding of embodiments. Other embodiments and many of the intended advantages will be readily appreciated as they become better understood by reference to the following detailed description. The elements of the drawings do not necessarily scale to each other Like reference numbers designate corresponding similar parts.

DETAILED DESCRIPTION OF INVENTION

In the following detailed description, reference is made to the accompanying drawings which form a part hereof and in which are shown by way of illustration specific embodiments in which the invention may be practised. In this regard, directional terminology, such as "top" or "bottom" etc. is used with reference to the orientation of the Figure(s) being described. Because components of embodiments can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

Figure 1:
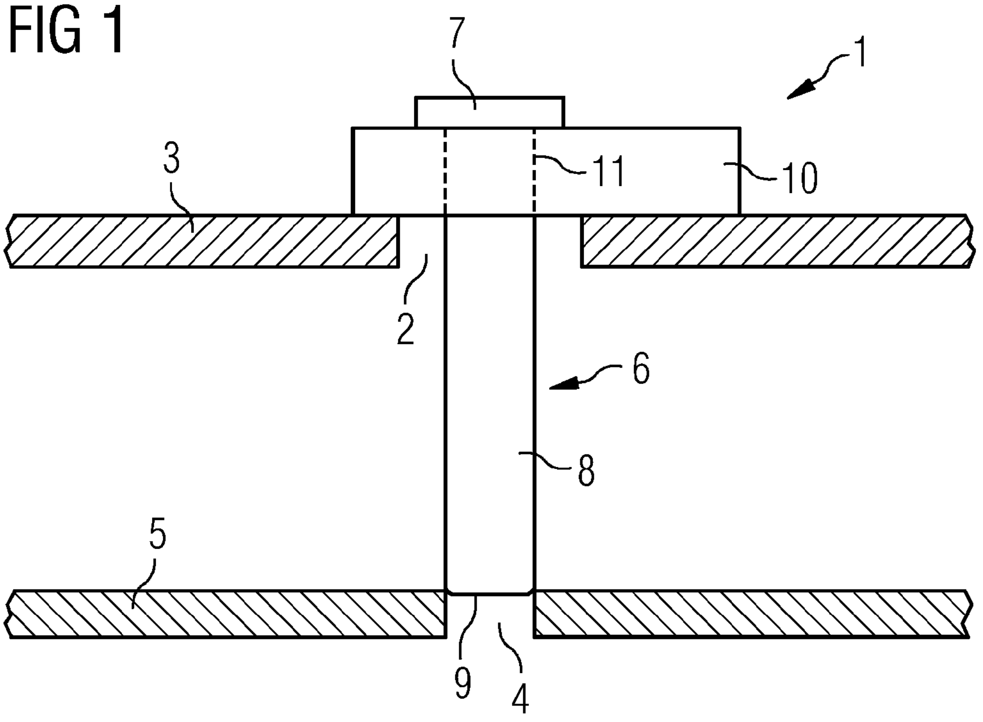
FIG. 1 illustrates a schematic cross-sectional view of a bore-scope apparatus according to the invention.

FIG. 1 shows a bore-scope sealing apparatus 1 for sealing an outer bore-scope opening 2 in an outer turbine wall 3 and an inner bore-scope opening 4 in an inner turbine wall 5. The walls 3 and 5 can be an outer casing and an inner carrier of an aircraft turbine, an industrial compressor or a gas or steam turbine.

The bore-scope sealing apparatus 1 has a plug 6 with a head 7 at an outer end of a shaft 8 and with an inner end 9 or sealing end for sealing the inner bore-scope opening 4 in the shown sealing position.

A cover plate 10 is mounted to the outer turbine wall 3 and seals the outer bore-scope opening 2 apart from a through hole 11 for the plug 6 which is sealed by the plug 7 in the sealed position.

Figure 2:
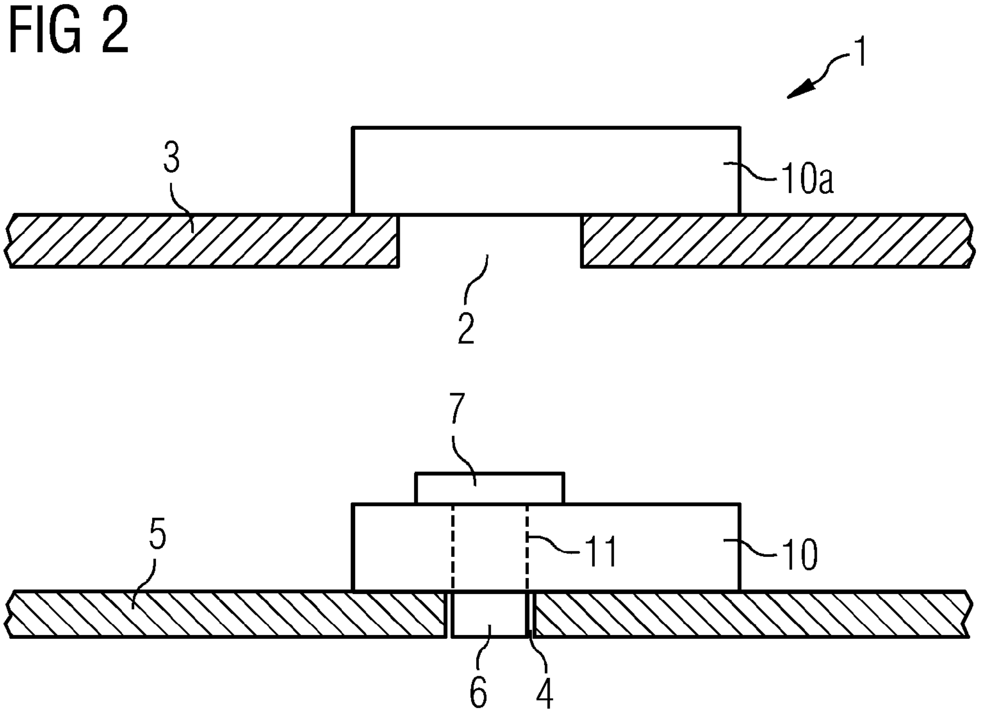
FIG. 2 illustrates a schematic cross-sectional view of a bore-scope apparatus according to the invention.

FIG. 2 shows an arrangement of the bore-scope sealing apparatus 1 in which the plug 6 is sealing the inner bore-scope hole 4 in the inner turbine wall 5. The cover plate 10 with the through hole 11 is mounted to the inner turbine wall 5 accordingly. The plug 6 can have the same dimensions as compared to FIG. 1. The length of the plug 6 may be reduced.

The diameter of the outer bore-scope opening 2 in the outer turbine wall 3 is slightly bigger than the diameter of the head 7 of the plug 6. Slightly bigger means that the outer bore-scope opening 2 is spacious enough for easy removal and mounting of the plug 6. Usually the head 7 has the largest diameter of all parts of the plug 6. In case another part than the head 7 has the largest diameter the diameter of the outer bore-scope opening 2 is adapted to this part.

The outer bore-scope opening 2 can be sealed with a sealing plate 10*a*. As the sealing plate 10*a* needs no through hole it is a massive plate at least in the area of the outer bore-scope opening 2. In a section right to the bore-scope opening 2 the sealing plate 10*a* can have an opening to fix it to the outer turbine wall 3.

Figure 3:
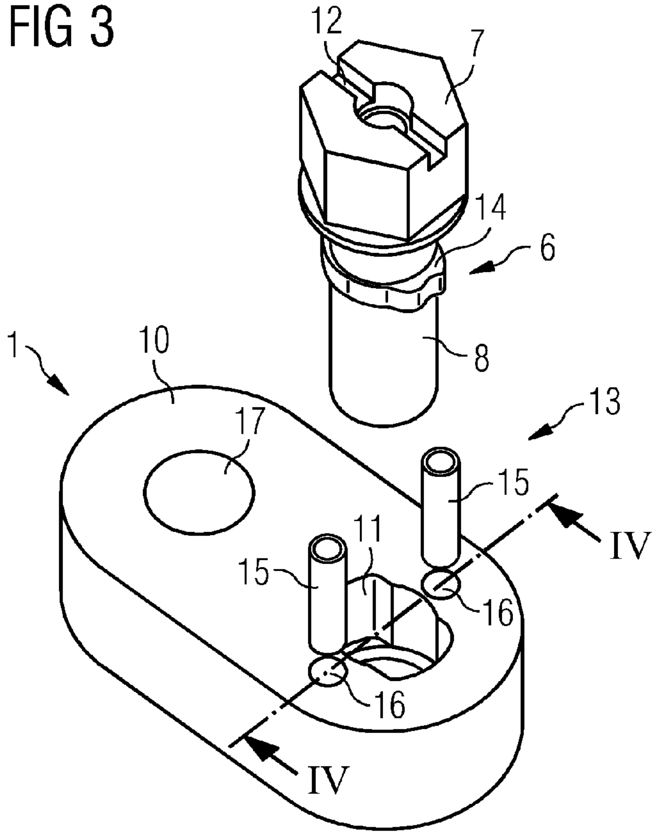
FIG. 3 illustrates a schematic exploded view of a plug and a bottom plate of a bore-scope apparatus according to the invention.
Figure 4:
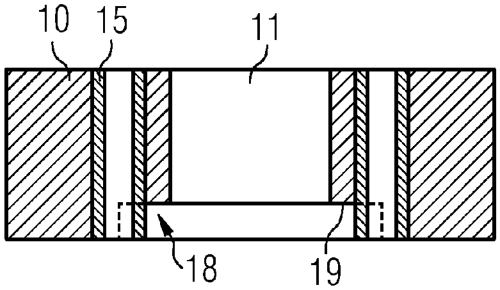
FIG. 4 illustrates a sectional view of the bottom plate along the line IV-IV of FIG. 3.

FIG. 3 shows an exploded view of the bore-scope sealing apparatus 1 and FIG. 4 shows a sectional view through the cover plate 10 along the line IV-IV in FIG. 3. The head 7 of the plug 6 has a drive feature 12 of the screwdriver type slot for example for fastening and releasing the plug 6. The bore-scope sealing apparatus 1 further has a bayonet coupling 13 for mounting the plug 6 to the outer bore-scope opening or to the cover plate 10.

The bayonet coupling 13 has two projections 14 at the shaft 8 of the plug 6. The two projections 14 are arranged opposite to each other. The projections 14 have a distance to the head 7 in longitudinal direction of the plug 6 which allows the projections 14 to fit in a corresponding recess 18 at the bottom side of the cover plate 10. The recess 18 has a circular shape and enlarges the through hole 11 so that the plug can be rotated about the longitudinal axis of the shaft 8 when the projections 14 are located in the recess 18. The recess 18 allows for accommodating the projections 14 of the plug 6 in any rotational position. Except for the recess 18 the through hole 11 has the shape of the circular shaft 8 with the two projections 14 so that the plug 6 can just pass through the through hole 11 in a single rotational orientation.

The bore-scope sealing apparatus 1 has a resilient retaining means in form of a spring pin 15 to retain the plug 6 in the outer opening 2 in a sealing position. The spring pin 15 has the shape of a cylinder and can be solid or hollow. The spring pin 15 can be resilient in its longitudinal and/or its radial direction. In the case of resilience in longitudinal direction the spring pin 15 presses against the head 7 of the plug 6 to retain it in the sealed position. In the case of resilience in radial direction the spring pin 15 presses against the projection 14 of the plug 6 to retain it in the sealed position. A combination of both retaining mechanisms is possible.

Two spring pins 15 are arranged opposite to each other around the through hole 11. The spring pins 15 are arranged in an opening 16 each. The openings 16 are located so close to the through hole 11 that they partly project into the space formed by the recess 18 (compare FIG. 4), i.e. into the enlarged area of the through hole 11 that allows for accommodating the projections 14 of the plug 6. When the plug 6 is rotated the spring pins 15 will be compressed by the projections 14. This is described later on in conjunction with FIGS. 6 to 8.

Figure 5:
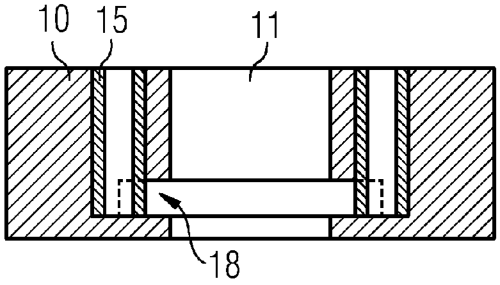
FIG. 5 illustrates an alternative design of the bottom plate in a sectional view.

In an open position of the bore-scope opening 2, i.e. with removed plug 6, the openings 16 are accessible from the outside. In the sealing position the spring pins 15 are held inside the openings 16 by the head 7 of the plug 6. The head 7 may have a special collar to cover the spring pins 15 or part of them. At the bottom side, the spring pins may 15 be held in place by the outer turbine wall 3 or inner turbine wall 5, respectively, or by some kind of washer located between the cover plate 10 and the outer turbine wall 3 or inner turbine wall 5, respectively. According to an alternative design of the cover plate 10, which is shown in FIG. 5, the recess 18 is located at an axial distance from the bottom side of the cover plate 10. Towards the bottom side of the cover plate 10, a section of the through hole 11 that is circular with a reduced diameter as compared to the diameter of the recess 18 follows on the recess 18. The reduced diameter is just large enough to let the circular shaft 8 of the plug 6 pass this section.

The cover plate 10 has a mounting opening 17 for a screw or a bolt to fix the cover plate 10 to the outer turbine wall 3. Other fastening mechanisms either removable or not can be employed. The cover plate 10 can also be part of the outer turbine wall 3.

Figure 6:
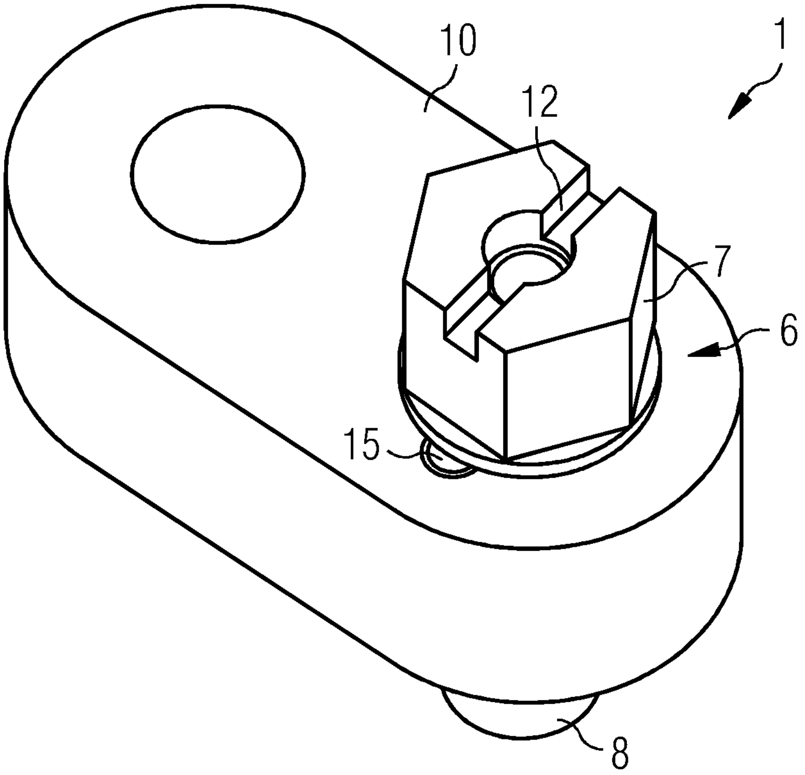
FIG. 6 illustrates a top view of a bore-scope apparatus in a sealing position according to the invention.

FIG. 6 shows the bore-scope sealing apparatus 1 in the sealing position in which the plug 6 is mounted and secured to the bore-scope opening or the cover plate 10. The plug is inserted to the outer bore-scope opening 2 while part of the shaft 8 extends beyond the cover plate 10 to seal an inner bore-scope opening 4. The length of the shaft 8 depends on the distance between inner and outer turbine wall and may be greater than depicted. Also, special designs of the inner end 9 of the shaft 8 are possible. They depend on the design of the inner bore-scope opening 4.

Compared to FIG. 3 the plug 6 is rotated by approximately ninety degrees as can be seen by the drive feature 12. The rotation enables the bayonet coupling 13 to be locked into the sealing position. The spring pins 15 are retained in their respective openings 16 by the head 7 of the plug 6.

Figure 7:
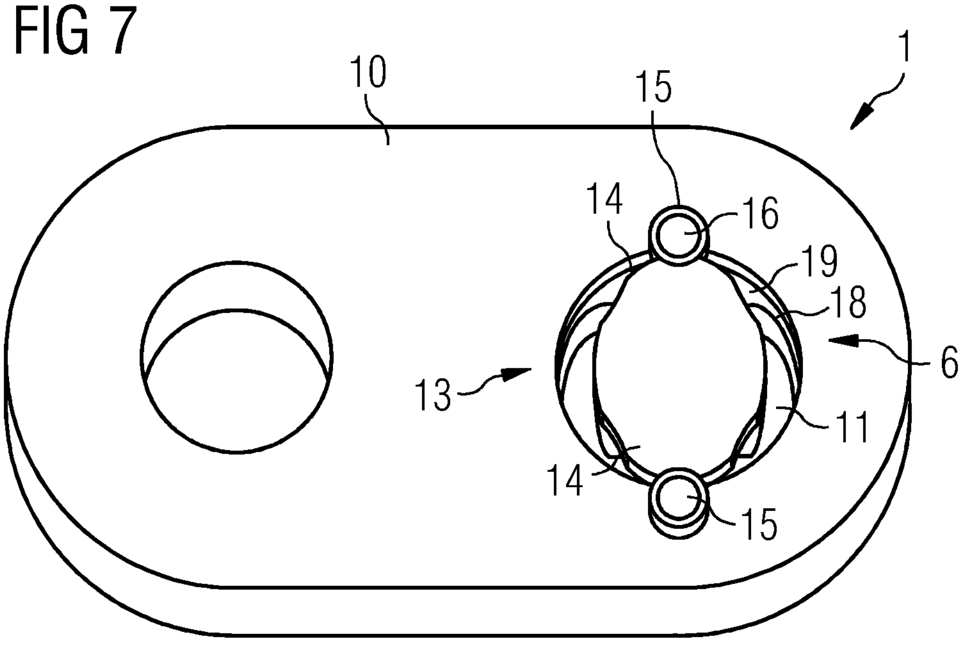
FIG. 7 illustrates a bottom view of a bore-scope apparatus in a sealing position according to the invention.

FIG. 7 shows the bottom or inner side of the bore-scope sealing apparatus 1 in the sealing position. The details of the bayonet coupling 13 are now explained which is locked in the sealing position.

The through hole 11 has a recess 18 which is a circular extension of the shaped through hole 11. The recess 18 has a diameter which allows for rotation of the plug 6 with its projections 14 inside the recess 18. An upper surface 19 or shoulder of the recess 18 secures the plug 6 against removal by its contact with the projections 14.

The openings 16 are in communication with the recess 18. They overlap each other so that the spring pins 15 arranged in the openings 16 project partially into the recess 18. The diameter of the recess 18, the position and size of the openings 16, the size and form of the spring pins 15 and the size and form of the projections 14 are designed such that the projections 14 press against the resilient spring pins 15 in the sealing position. The spring pins 15 secure the plug 6 against accidental rotation and subsequent removal.

Figure 8:
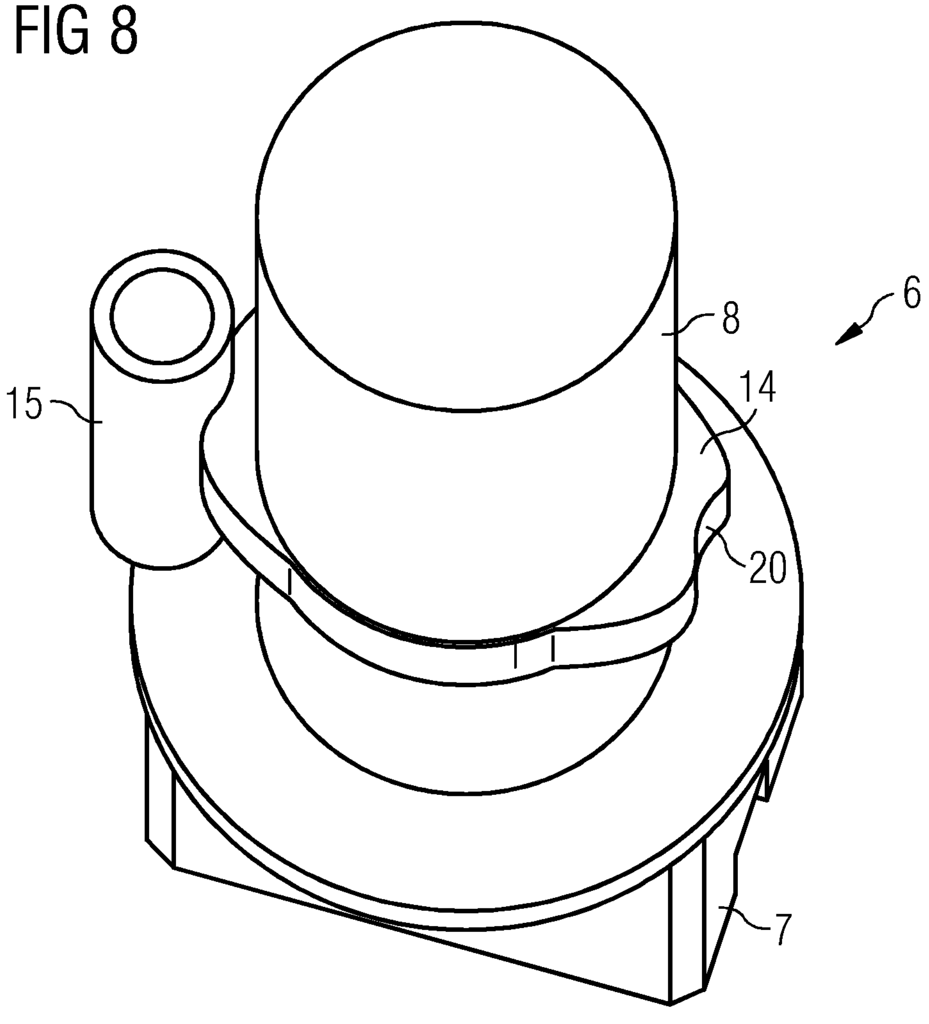
FIG. 8 illustrates a detailed view of a bayonet coupling of a bore-scope apparatus according to the invention.

FIG. 8 shows a bottom view of the plug 6 with the head 7 depicted in the background and the shaft 8 in the foreground. Here, the projections 14 each have a retaining recess 20 for accommodation of part of the spring pin 15. The retaining recesses 20 hold the plug 6 even better in the sealing position. The design of the bore-scope sealing apparatus 1 can be such that the spring pins 15 are not compressed by the projections 14 in the sealing position. In this case the spring pins 15 are only compressed while moving in the sealing position. Alternatively the design can be such that the spring pins 15 are compressed in the sealing position, either only to a small amount or to a greater amount. Both designs guarantee proper fixing of the bore-scope sealing apparatus 1 in the sealing position.

Gaskets can be utilized at both bore-scope openings. They are not depicted for the sake of clarity.

The bore-scope sealing apparatus 1 is brought to the sealing position by inserting the plug 6 into the outer bore-scope opening 2 and if existent the inner bore-scope opening 4 or by inserting the plug directly into the inner bore-scope opening 4. Once the head 7 of the plug 6 abuts against an upper surface of the cover plate 10 or of the turbine wall 3 the plug is being rotated by approximately ninety degrees. During the rotation the projections 14 are sliding inside the recess 18 thereby abutting against the upper surface 19 which tightens the plug 6. Upon further rotation the projections 14 engage with the spring pins 15. The spring pins 15 are being compressed thereby holding the plug 6 securely in the sealing position.

To release the plug 6 from the sealing position the plug 6 is turned ninety degrees so that the projections 14 leave the recess 18 and fit into the through hole 11 for extraction of the plug 6. The spring pins 15 can be dimensioned such that they have a length longer than the length of the openings 16. Then, they can support the extraction of the plug 6 by spring force.

The invention claimed is:

1. A turbomachine, comprising:

a wall defining a bore-scope opening, and a bore-scope sealing apparatus for removably sealing the bore-scope opening with a plug, the bore-scope sealing apparatus comprising:

a bayonet coupling via which the plug is mountable to the bore-scope opening, wherein the bayonet coupling comprises a projection at the plug and a corresponding recess at the bore-scope opening, and a resilient retaining device arranged at the recess being compressed by the projection in a sealing position to retain the plug in the bore-scope opening.

2. The turbomachine according to claim 1, wherein the retaining device is a spring pin.

3. The turbomachine according to claim 1, wherein the retaining device is arranged in an opening accessible from the outside and the opening is in communication with the recess.

4. The turbomachine according to claim 1, wherein the projection comprises a retaining recess for accommodation of part of the retaining device.

5. The turbomachine according to claim 1, wherein the plug comprises two projections, opposite to each other.

6. The turbomachine according to claim 5, comprising two retaining devices opposite to each other.

7. The turbomachine according to claim 1, wherein the plug comprises a head with a drive feature and the head covers the retaining device at least partially in the sealing position.

8. The turbomachine according to claim 1, wherein the plug is mountable to an outer bore-scope opening in an outer turbine wall and the plug comprises a shaft with a sealing end for sealing an inner bore-scope opening in an inner turbine wall.

9. A plug for a bore-scope sealing apparatus of a turbomachine according to claim 1, the plug comprising:

a head, and a shaft having a longitudinal direction, wherein the shaft comprises at least one projection at a distance to the head in the longitudinal direction.

10. The plug according to claim 9, comprising two projections arranged opposite to each other.

11. The plug according to claim 9, wherein the at least one projection has a retaining recess.

12. The plug according to claim 9, wherein the shaft further comprises a sealing end for sealing an inner bore-scope opening in an inner turbine wall.

13. A bore-scope sealing apparatus for removably sealing a bore-scope opening in a turbomachine wall with a plug, the bore-scope sealing apparatus comprising:

a bayonet coupling via which the plug is mountable to the bore-scope opening, wherein the bayonet coupling comprises a projection at the plug adapted to engage a corresponding recess at the bore-scope opening, and a resilient retaining device arranged at the recess being compressed by the projection in a sealing position to retain the plug in the bore-scope opening, wherein the plug comprises a gasket.

14. A bore-scope sealing apparatus for removably sealing a bore-scope opening in a turbomachine wall with a plug, the bore-scope sealing apparatus comprising:

a bayonet coupling via which the plug is mountable to the bore-scope opening, wherein the bayonet coupling comprises a projection at the plug adapted to engage a corresponding recess at the bore-scope opening, a resilient retaining device arranged at the recess being compressed by the projection in a sealing position to retain the plug in the bore-scope opening, wherein the plug is mountable to an inner bore-scope opening in an inner turbine wall, and a sealing plate mountable to an outer bore-scope opening in an outer turbine wall.

* * * * *